US012110096B2

(12) United States Patent
MacDonald et al.

(10) Patent No.: US 12,110,096 B2
(45) Date of Patent: Oct. 8, 2024

(54) ACTIVE COOLING OF WINDWARD SURFACE OF CRAFT

(71) Applicant: The Boeing Company, Chicago, IL (US)

(72) Inventors: Elaine MacDonald, Wildwood, MO (US); Jeremy Nicholas O'Hara, University City, MO (US); Daniel Edward Driemeyer, St. Louis, MO (US); Grant G. Gvozdich, Columbia, IL (US); Justin L'Hote, St. Peters, MO (US); Ali Yousefiani, Tustin, CA (US); Nicholas B. Segobiano, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/650,771

(22) Filed: Feb. 11, 2022

(65) Prior Publication Data

US 2022/0340252 A1 Oct. 27, 2022

Related U.S. Application Data

(60) Provisional application No. 63/180,543, filed on Apr. 27, 2021.

(51) Int. Cl.
*B64C 1/38* (2006.01)
(52) U.S. Cl.
CPC ..................... *B64C 1/38* (2013.01)

(58) Field of Classification Search
CPC .... B64C 1/38; B64C 3/28; B64C 3/36; B64G 1/58; B64D 13/006; B64D 15/08; F42B 15/34
See application file for complete search history.

(56) References Cited

U.S. PATENT DOCUMENTS

| 4,786,015 A * | 11/1988 | Niggemann | B64C 1/38 165/184 |
| 4,923,146 A | 5/1990 | Anthony | |
| 5,257,757 A | 11/1993 | Paul et al. | |
| 11,407,488 B2 * | 8/2022 | Rathay | B64C 1/38 |
| 2004/0245389 A1 * | 12/2004 | Behrens | F28F 13/003 244/117 A |

(Continued)

FOREIGN PATENT DOCUMENTS

| CN | 105366029 A | 3/2016 |
| CN | 106516072 A | 3/2017 |
| EP | 1500880 A2 | 1/2005 |

OTHER PUBLICATIONS

Intellectual Property Office of the United Kingdom, Office Action Issued in Application No. GB2202219.8, Jun. 13, 2023, 3 pages.

(Continued)

*Primary Examiner* — Philip J Bonzell
*Assistant Examiner* — Colin Zohoori
(74) *Attorney, Agent, or Firm* — Alleman Hall & Tuttle LLP

(57) ABSTRACT

An envelope portion of an airborne craft comprises a metallic outer wall and a metallic inner wall arranged interior to the outer wall. The outer and inner walls delimit an interwall volume configured to support a flow of coolant to cool the outer wall during atmospheric heating of the outer wall.

20 Claims, 10 Drawing Sheets

(56) References Cited

U.S. PATENT DOCUMENTS

| | | | | |
|---|---|---|---|---|
| 2011/0253344 | A1* | 10/2011 | Kuhn | B64C 3/36 |
| | | | | 165/104.19 |
| 2015/0354907 | A1* | 12/2015 | Herzberg | B23P 15/26 |
| | | | | 165/135 |
| 2021/0147087 | A1* | 5/2021 | Gerstler | B64C 1/38 |

OTHER PUBLICATIONS

United Kingdom Intellectual Property Office, Search Report Issued in Application No. GB2202219.8, Aug. 19, 2022, 8 pages.

North, M. et al., "Test Results From a Helium Gas-Cooled Porous Metal Heat Exchanger," Proceedings of the 1996 Conference on Space Processing of Materials at SPIE International Society for Optical Engineering (SPIE) Annual International Symposium on Optical Science, Engineering, And Instrumentation, Aug. 4-9, 1996, Denver, Colorado, USA, 12 pages.

National Research Council, "High-Temperature Oxidation-Resistant Coatings: Coatings for Protection From Oxidation of Superalloys, Refractory Metals, and Graphite," The National Academies Press, Jan. 1, 1970, 230 pages.

Fitzgerald, E. et al., "Primary Thruster Coating Life Testing and Flight Rationale Summary," Boeing company report dated Jul. 18, 2011, Houston, Texas, USA, 217 pages.

Rosenfeld, J. et al., "Evaluation of Porous Media Heat Exchangers for Fusion Applications", Fusion Technology, vol. 29, No. 4, Jul. 1996, 11 pages.

\* cited by examiner

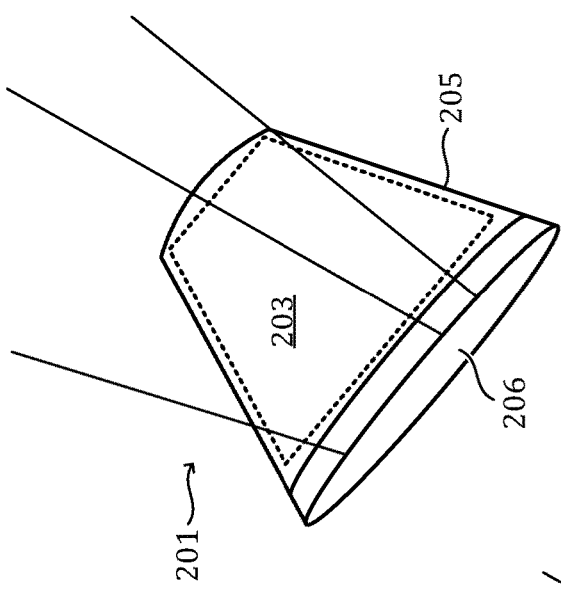
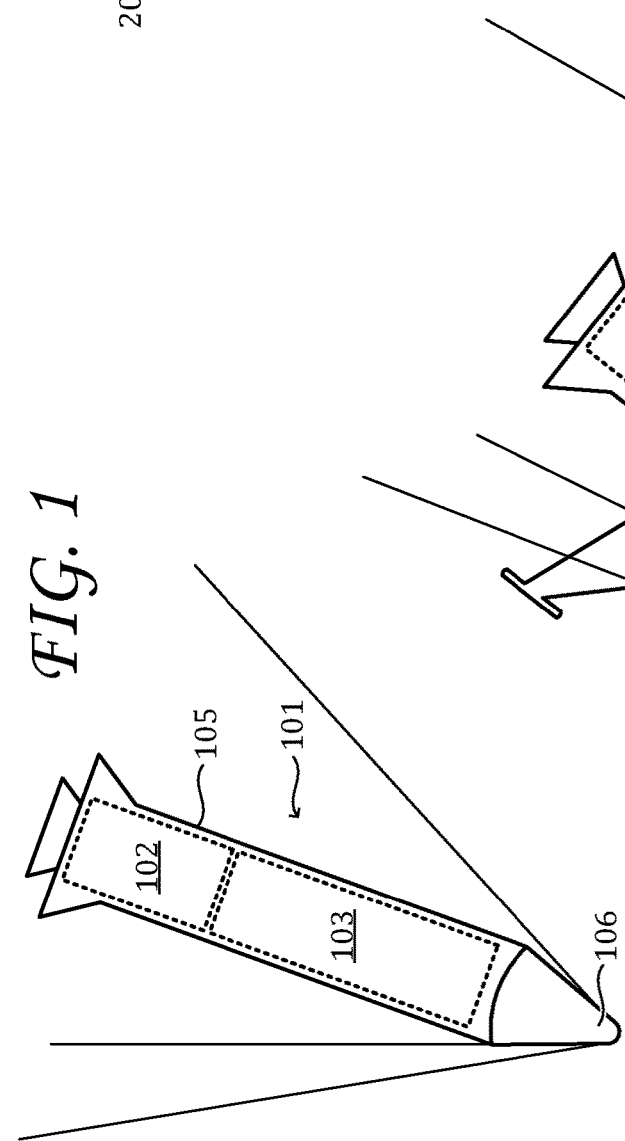
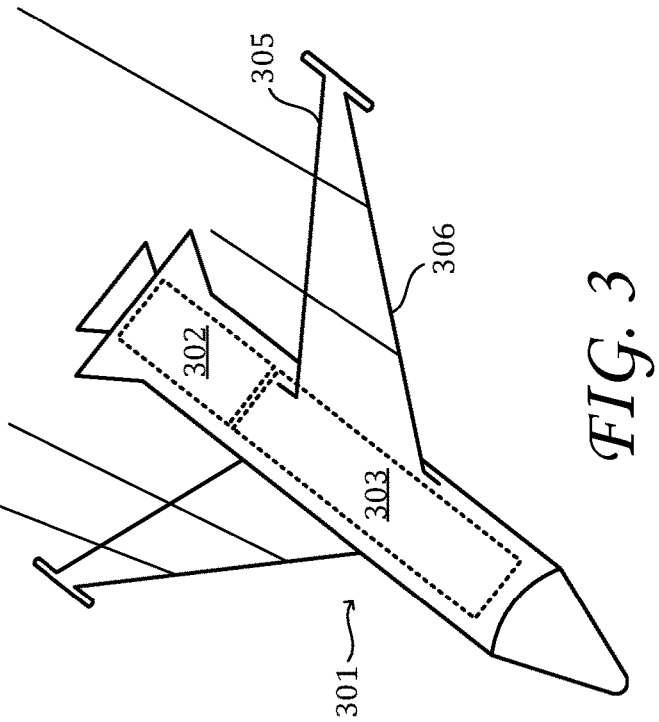

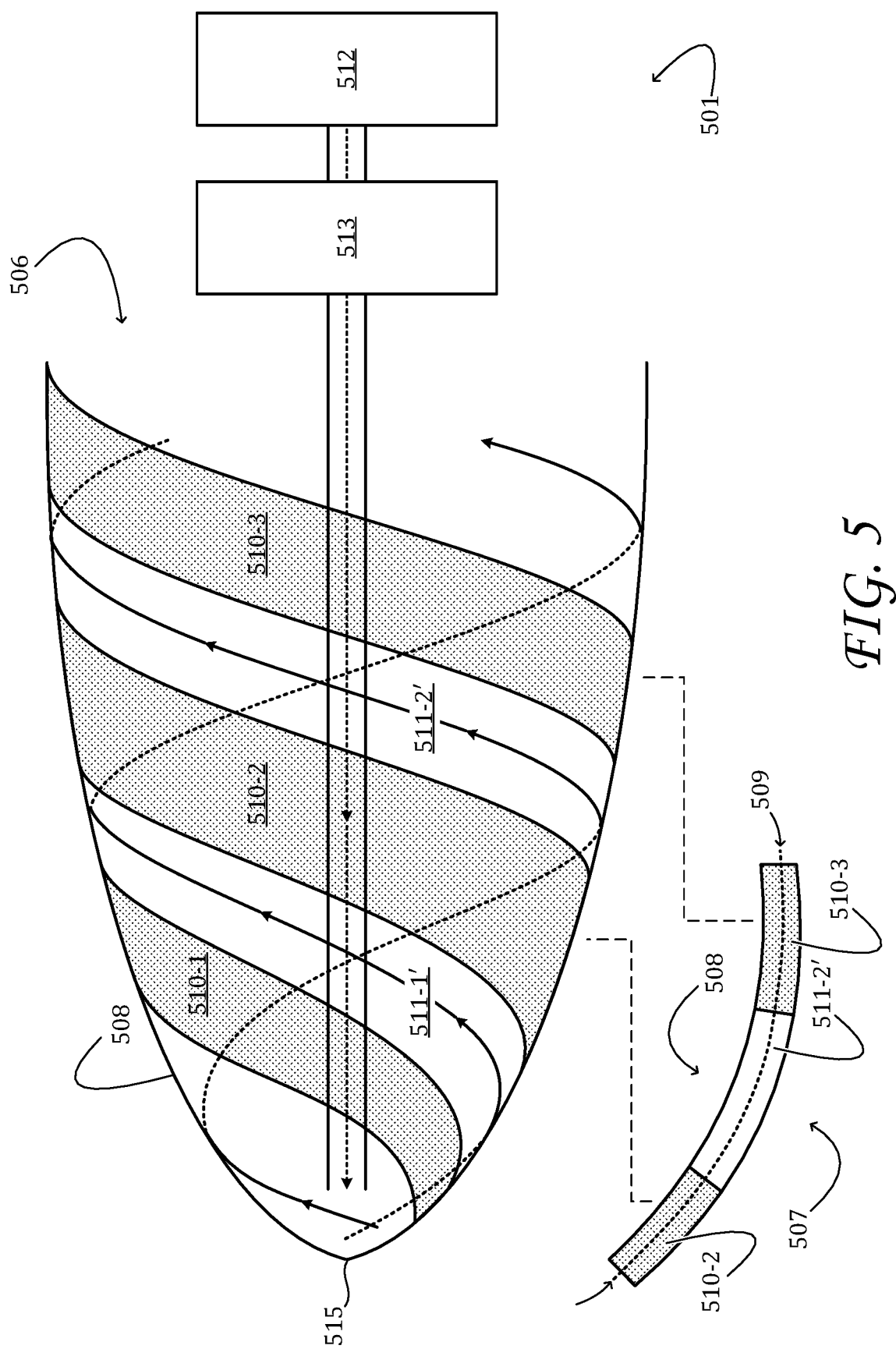

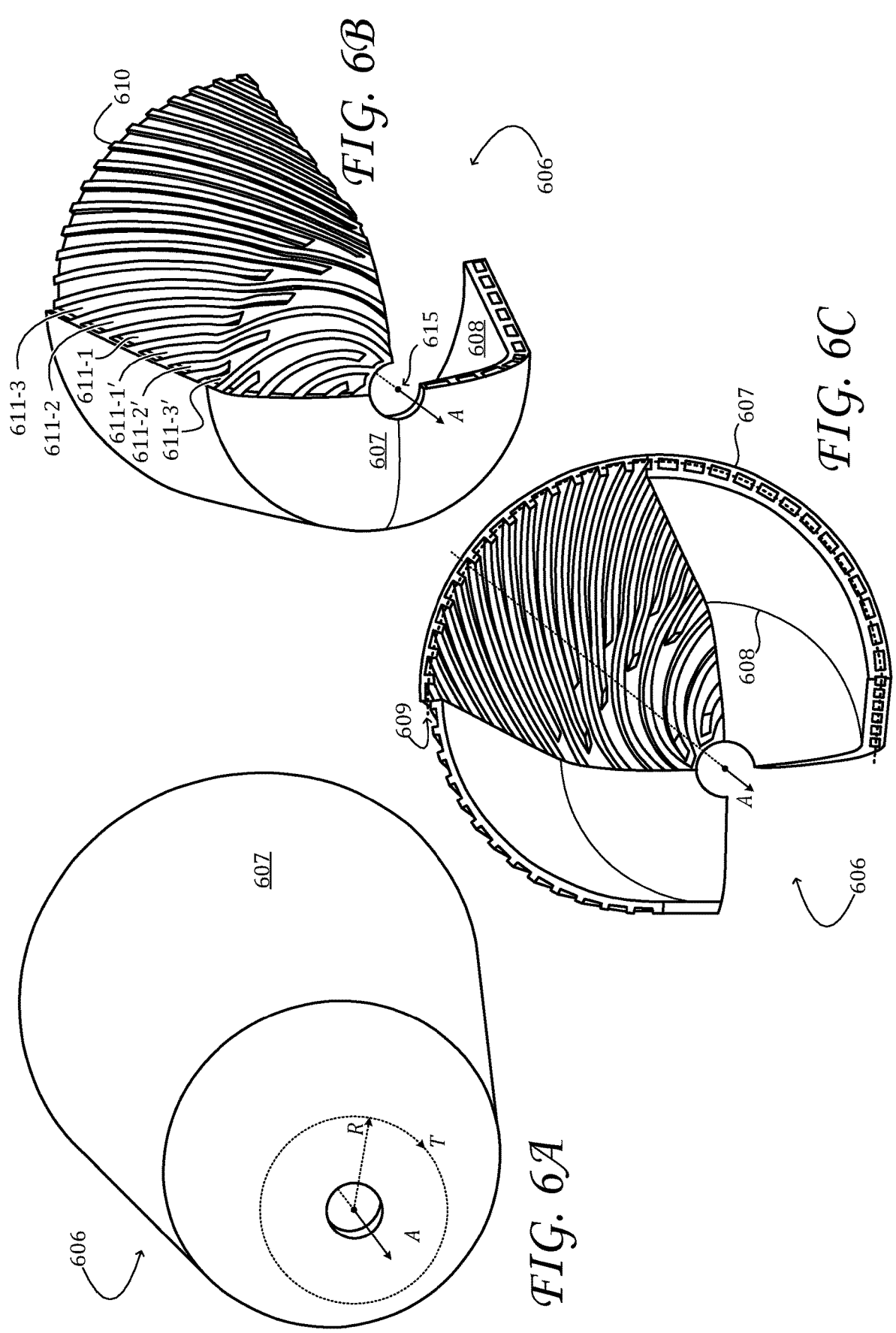

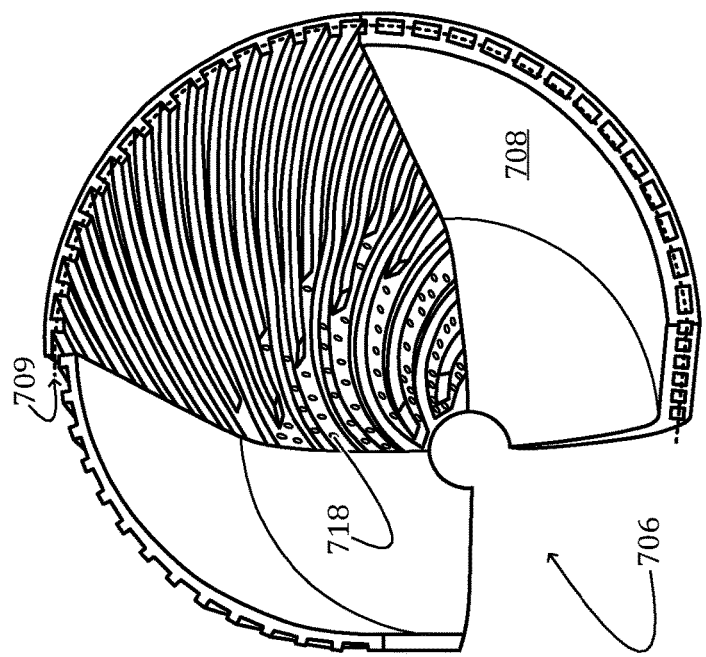
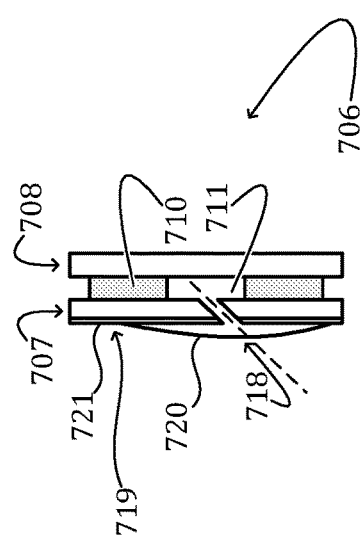
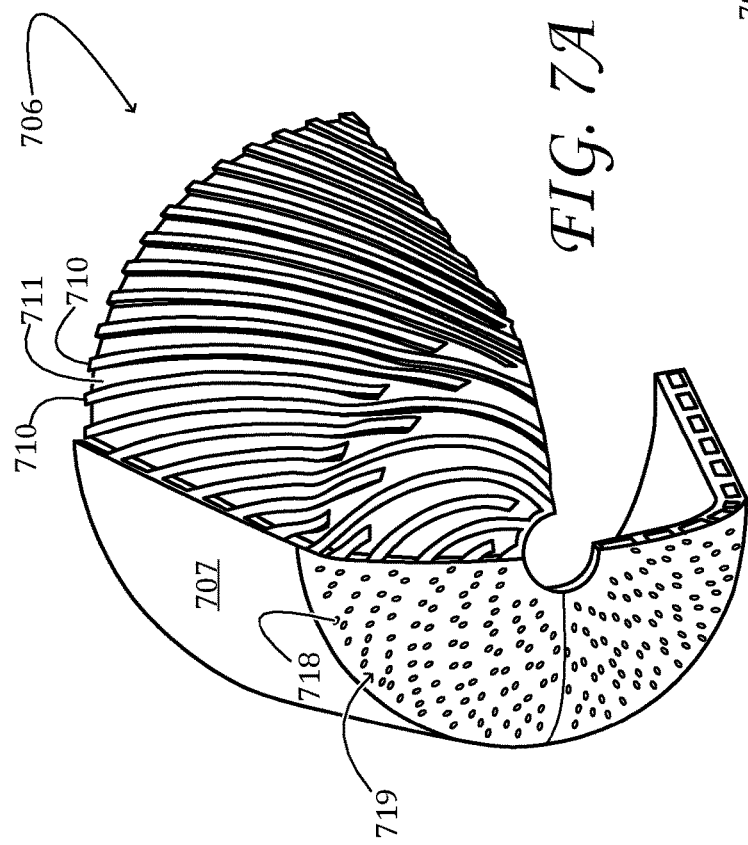
FIG. 7A
FIG. 7B
FIG. 7C

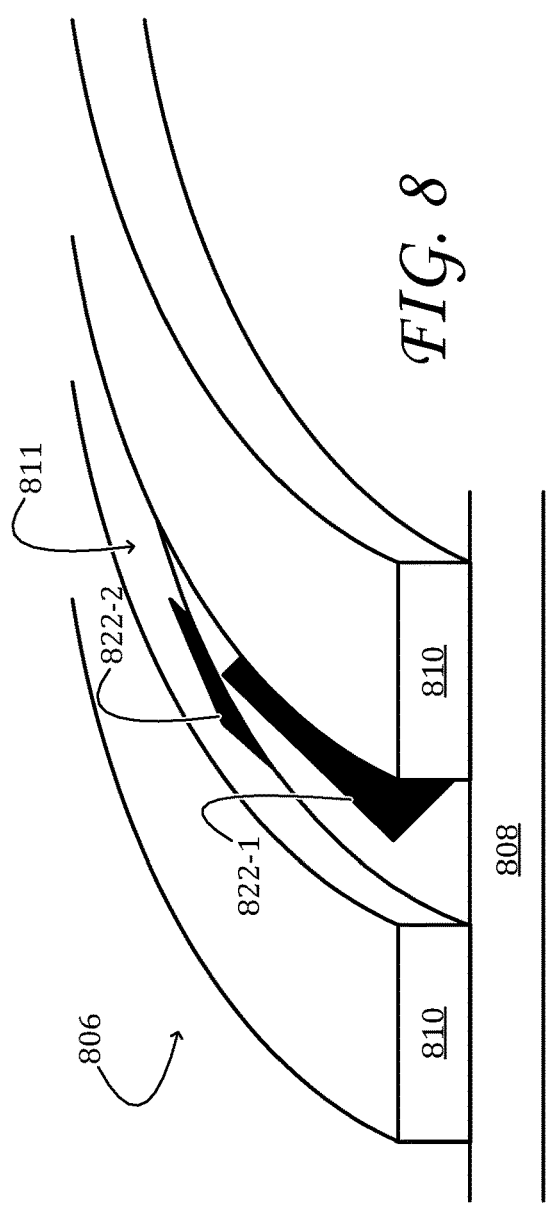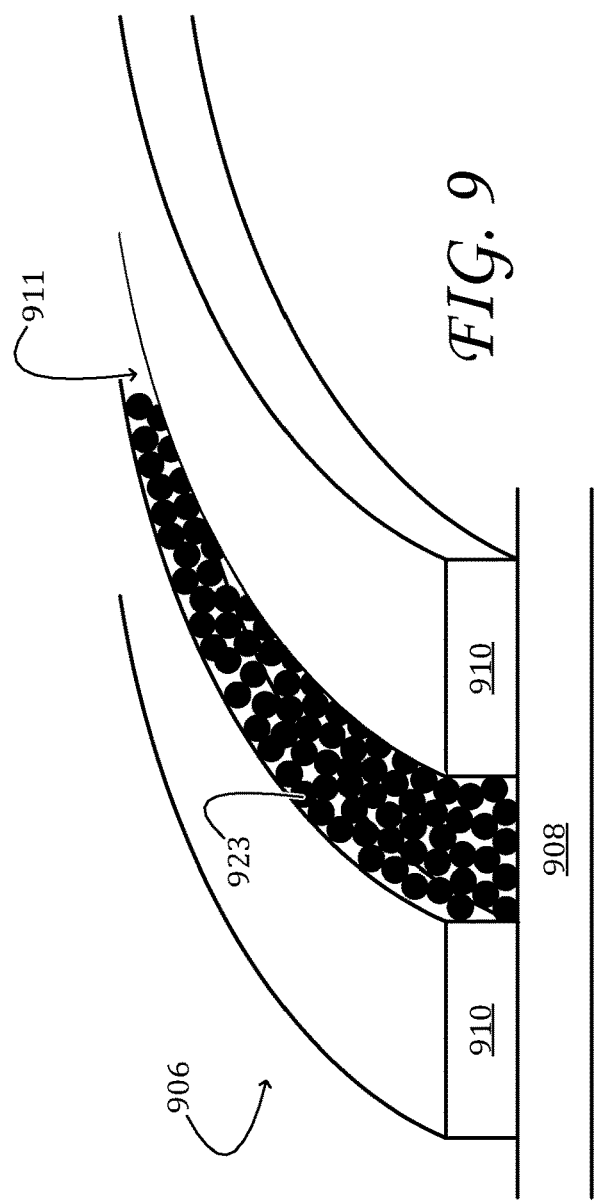

US 12,110,096 B2

ACTIVE COOLING OF WINDWARD SURFACE OF CRAFT

CROSS REFERENCE TO RELATED APPLICATIONS

This application claims priority to U.S. Provisional Patent Application Ser. No. 63/180,543, filed Apr. 27, 2021, the entirety of which is hereby incorporated herein by reference for all purposes.

GOVERNMENT LICENSE RIGHTS

This invention was made with Government support under contract number HQ0860-20-C-6052 awarded by Department of Defense. The government has certain rights in this invention.

TECHNICAL FIELD

This disclosure relates generally to hypersonic projectiles, aircraft, and spacecraft, and, more particularly, to cooling of surfaces of hypersonic projectiles, aircraft, and spacecraft.

BACKGROUND

Due to the combined effects of atmospheric drag and compression, a windward surface of an airborne craft is subject to aerodynamic heating. While all types of craft moving through an atmosphere may experience such heating, the effect is especially acute for hypersonic vehicles and projectiles (e.g., missiles, re-entry vehicles, and spacecraft) that enter or re-enter the atmosphere at high velocity. To manage the thermal stress on such craft, windward surfaces may be formed from highly refractory ceramic materials. However, a ceramic windward surface may be prone to impact damage, expensive to manufacture or repair, and difficult to bond to the underlying metal substrate or other components of the craft. Moreover, for windward surfaces subject to the intense heat of atmospheric re-entry, the interface to the substrate must be carefully engineered to minimize mechanical stress on re-entry, due to dissimilar coefficients of thermal expansion.

SUMMARY

In view of the issues identified above, aspects of this disclosure are directed to envelope portions of airborne craft. One envelope portion comprises a metallic outer wall and a metallic inner wall arranged interior to the outer wall. The outer and inner walls delimit an inter-wall volume configured to support a flow of coolant to cool the outer wall during atmospheric heating of the outer wall.

Another envelope portion comprises a metallic outer wall including a plurality of thru-holes and a metallic inner wall arranged interior to the outer wall. The outer and inner walls delimit an inter-wall volume configured to support a flow of coolant to cool the outer wall during atmospheric heating of the outer wall. In this example, the plurality of thru-holes of the outer wall extend into the inter-wall volume to release at least a portion of the coolant onto an exterior surface of the outer wall, thereby forming a barrier film on the exterior surface.

This Summary is not intended to identify key features or essential features of the claimed subject matter. Neither is the scope of the claimed subject matter limited to implementations that address any problems or disadvantages that may be noted in any part of this disclosure. The features, functions, and advantages described in this disclosure may be achieved independently in some implementations and may be combined in other implementations.

BRIEF DESCRIPTION OF THE DRAWINGS

This disclosure will be better understood from reading the following Detailed Description with reference to the attached drawing figures, wherein:

FIGS. 1, 2, and 3 show aspects of example airborne craft;

FIGS. 4 and 5 show additional aspects of example airborne craft;

FIGS. 6A, 6B, and 6C show aspects of an example envelope portion of an airborne craft;

FIGS. 7A, 7B, and 7C show aspects of another example envelope portion of an airborne craft;

FIGS. 8 and 9 show aspects of example coolant-flow channels of envelope portions of airborne craft;

DETAILED DESCRIPTION

Figure 4:
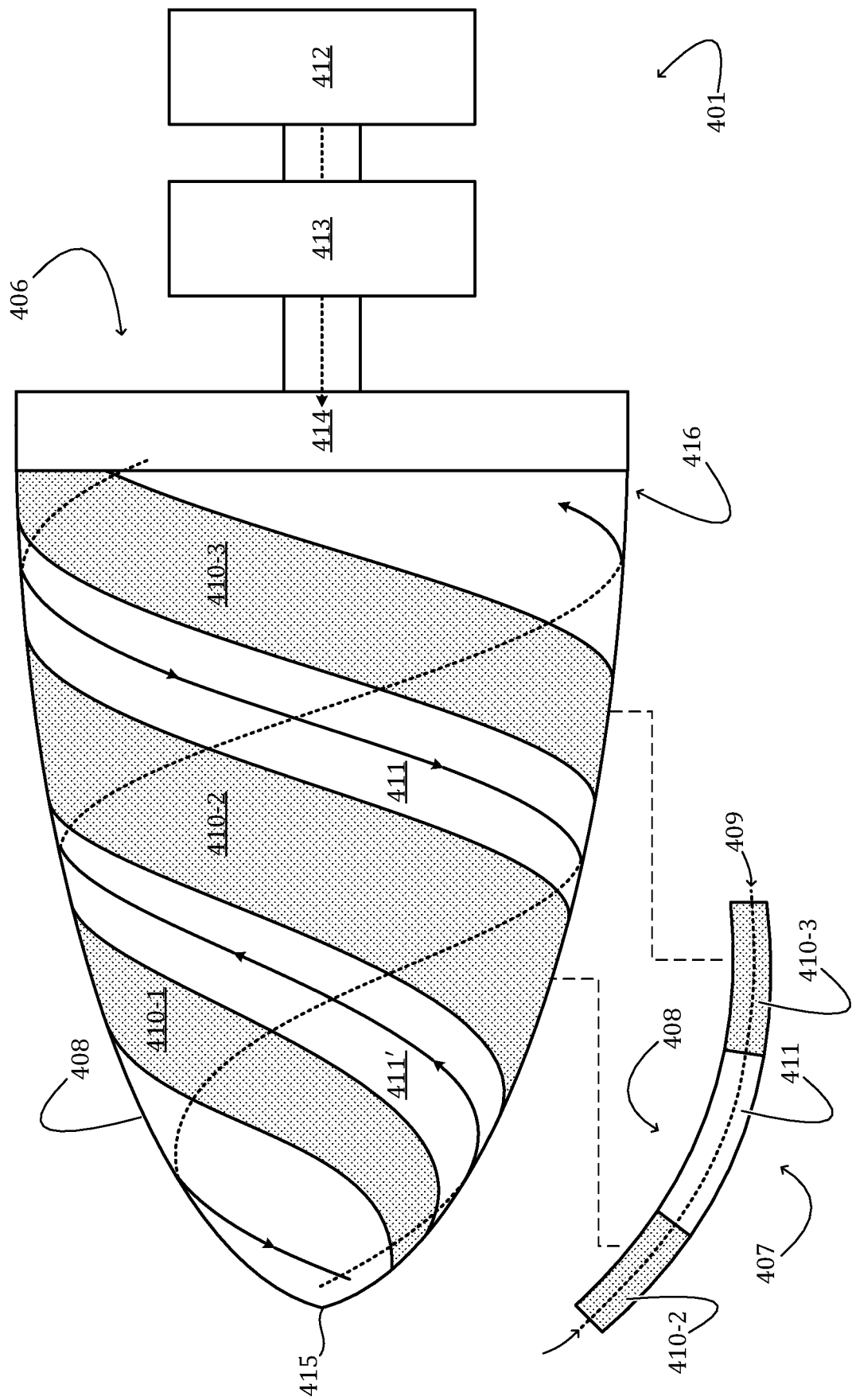

As noted above, an alternative to ceramic construction is desirable for windward surfaces of various types of hypersonic, airborne craft. Ideally, an all-metal solution that reduces or eliminates material interfaces on the envelope of the craft is most desirable. However, an all-metal envelope portion subject to re-entry conditions may require active cooling in order to limit ablation and oxidative stress to acceptable levels. In the solutions presented herein, the nose, leading edge of a swept-wing, or other windward portion of the envelope comprises inner and outer walls that support a flow of coolant. Partitions arranged between the outer and inner walls guide the coolant along pre-determined flow paths that enhance cooling efficiency. In some examples, the partitions define a series of channels through which the coolant flows forward and back along radial and tangential flow paths. In some examples, cooling is enhanced by injection of a portion of the coolant onto the exterior surface of the envelope portion, thereby forming a protective, volatilizing film on the exterior surface. In some examples, the double-walled structure of the envelope portion and the partitions arranged in the inter-wall volume may be monolithic and/or formed via additive manufacture (AM).

The balance of this disclosure will now be described by way of example and with reference to the attached drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example airborne craft 101 in the form of a ballistic missile. Airborne craft 101 includes an engine 102, a payload 103, and an envelope 105. The envelope of the airborne craft is comprised of plural portions, which include windward envelope portion 106 (viz., a nose portion). FIG. 2 shows aspects of another example airborne craft 201 in the form of a re-entry vehicle. Airborne craft 201 includes payload 203 and an envelope 205 comprising a windward envelope portion 206. FIG. 3 shows aspects of another example airborne craft 301 in the form of an aircraft or spacecraft. Airborne craft 301 includes engine 302, payload 303, and envelope 305 comprising a windward envelope portion 306 (viz., a swept wing). Each of the airborne crafts shown in FIGS. 1, 2, and 3 may attain hypersonic velocities during atmospheric re-entry and/or other flight conditions. Accordingly, the windward surfaces of these airborne crafts may be subject to intense atmospheric heating—and, as such, the approaches disclosed herein may be applicable thereto. It will be understood that such approaches are not limited to the illustrated examples, but may be applied to windward envelope portions of other types of craft. Moreover, some airborne craft (e.g., airborne craft 301) may include plural, disparate surfaces subject to intense atmospheric heating, where the approaches herein may be applied in concert.

FIG. 4 shows additional aspects of an example airborne craft 401 having a windward envelope portion 406. The windward envelope portion includes a metallic outer wall 407 and a metallic inner wall 408 arranged interior to (i.e., beneath) the outer wall. Taken together, the outer and inner walls of envelope portion 406 delimit an inter-wall volume 409. As described in further detail below, the inter-wall volume is configured to support a flow of coolant to cool outer wall 407 during atmospheric heating. To that end, envelope portion 406 includes a plurality of coolant-flow partitions 410 (e.g., coolant-flow partitions 410-1, 410-2, and 410-3), formed or otherwise arranged in inter-wall volume 409 and joining outer wall 407 to inner wall 408. Taken together, each pair of opposing coolant-flow partitions defines a channel 411. In FIG. 4, for instance, opposing coolant-flow partitions 410-1 and 410-2 define channel 411', and opposing coolant-flow partitions 410-2 and 410-3 define channel 411). For ease of illustration, FIGS. 4 and 5 show sparse, simplified configurations of coolant-flow partitions and channels. This disclosure also contemplates denser and more complex configurations, as described hereinafter.

Airborne craft 401 includes a coolant reservoir 412, coolant pump 413, and coolant manifold 414, each directly or indirectly coupled fluidically to inter-wall volume 409. The coolant stored in the coolant reservoir may comprise a volatile liquid (e.g., water), a sublimable solid (e.g., carbon dioxide) or a compressed gas. In some examples, the coolant stored in the coolant reservoir may be maintained at elevated pressure (e.g., 600 psia). Other pressures and storage conditions are equally envisaged, and it will be understood that the coolant pump may be omitted in examples in which the coolant is stored at sufficiently high pressure.

Continuing in FIG. 4, coolant-flow partitions 410-2 and 410-3 delimit a forward-flow channel 411 configured to receive unheated coolant from the coolant reservoir and to conduct the coolant through the inter-wall volume. Coolant-flow partitions 410-1 and 410-2 delimit a reverse-flow channel 411' configured to receive and conduct atmospherically heated coolant through the inter-wall volume. In the example shown in FIG. 4, the reverse-flow channel is arranged fluidically downstream of the forward-flow channel.

In some examples, coolant-flow partitions 410 delimit a plurality of forward-flow channels, through which the coolant flows toward nose 415 of airborne craft 401, and a plurality of reverse-flow channels through which the coolant flows away from the nose. In these and other examples, the plurality of reverse-flow channels may be arranged fluidically downstream of the plurality of forward-flow channels and coupled thereto. More specifically, any subset of the plurality of reverse-flow channels may be arranged downstream of a corresponding subset of the plurality of forward-flow channels. Furthermore, the corresponding subsets of forward- and reverse-flow channels may be networked in some examples and substantially independent in other examples.

Forward-flow channels 411 of FIG. 4 extend to coolant manifold 414, which is arranged at base 416 of windward envelope portion 406 and configured to receive unheated coolant from coolant reservoir 412. In this example, where the windward envelope portion is a substantially conical nose portion, the base takes the form of a frustum. In other examples (as shown in FIG. 5), the forward-flow channels may be omitted and the coolant may be conducted directly to the apex of the windward envelope portion. In examples as illustrated in FIG. 4, coolant-flow partitions 410 and channels 411/411' are substantially helical. It will be noted, however, that the term 'helical' neither requires nor excludes a regular helix of invariant pitch. In some examples, a helical coolant-flow partition or channel may straighten with increasing distance from the nose and become substantially linear over the frustum or base of the envelope portion.

FIG. 5 shows additional aspects of an example airborne craft 501 having a windward envelope portion 506, metallic outer wall 507, metallic inner wall 508, and inter-wall volume 509. Here, as in the previous example, opposing coolant-flow partitions 510 (e.g., 510-1, 510-2, 510-3) define plural channels 511' (e.g., 511-1', 511-2'). In airborne craft 501, however, optional coolant pump 513 pumps unheated coolant from coolant reservoir 512 directly to the forward extremum (e.g., apex) of inter-wall volume 509. In this example, coolant flows in the aft direction through each of the channels. In some implementations, manifold injection of the coolant, as illustrated in FIG. 4 may be easiest to integrate into the overall envelope design, whereas nose injection as illustrated in FIG. 5 may provide superior cooling.

The configurations of FIGS. 4 and 5 are not exhaustive of the range of coolant-flow variants here contemplated. For instance, unheated coolant may be conducted from a manifold through helical flow paths to the nose (as in FIG. 4) and then the heated coolant may leave the nose area by flowing aft through a conduit (opposite the flow direction in FIG. 5), or may be ejected from the nose. Thus, the present disclosure embraces all suitable subcombinations of the illustrated examples.

FIGS. 6A through 7C present more detailed illustrations of a windward envelope as shown in FIG. 1 using forward-and-reverse flow-channels as shown in FIG. 4. This combination of features is selected for ease of illustration and is not intended to be limiting in any sense. Indeed, each of the additional features introduced in FIGS. 6A through 7C is usable together with the envelope geometries of FIGS. 2 and 3 and with the aft-flow configuration of FIG. 5. Moreover, such geometries and configurations are usable together.

FIGS. 6A, 6B, and 6C show aspects of an example windward envelope portion 606 of an airborne craft. The windward envelope portion includes metallic outer wall 607, metallic inner wall 608, and inter-wall volume 609, where opposing coolant-flow partitions 610 define plural channels 611/611' (e.g., 611-1, 611-1', etc.).

In envelope portion 606, coolant-flow partitions 610 extend radially (direction R) and tangentially (direction T)

about axis A, which is aligned to a trajectory of airborne craft 601 when the airborne craft is in flight. Thus, in the illustrated example, where the windward envelope portion is a substantially conical nose portion, the coolant-flow partitions are helical. That aspect is not strictly necessary, however, as coolant-flow partitions may extend radially and tangentially about a trajectory-aligned axis without being helical. Generally speaking, combined tangential and radial coolant flow distributes heat around the envelope portion, thereby reducing thermal gradients. Moreover, continuously curved and elongate (e.g., helical) flow paths provide enhanced wall impingement, which promotes heat transfer between the coolant and the outer wall of the envelope. Despite these advantages, non-radial and/or non-tangential coolant-flow may be used in some examples. Such paths may be linear, smoothly curvilinear, or tortuous with many turns, depending on the implementation.

In envelope portion 606, coolant-flow partitions 610 are configured to increasingly merge the plurality of forward-flow channels 611 with increasing proximity to nose 615 of the airborne craft. Likewise, the coolant-flow partitions are configured to increasingly divide the plurality of reverse-flow channels 611' with increasing distance from the nose of the airborne craft. In the illustrated example, three adjacent forward-flow channels 611-1, 611-2, and 611-3 merge in a stepwise manner: forward-flow channel 611-1 first merges into forward-flow channel 611-2, and then forward-flow channel 611-2 further merges into forward flow channel 611-3. Similarly, each reverse flow channel originating at the nose divides in a stepwise manner: reverse flow channel 611-1' first divides into reverse-flow channels 611-1' and 611-2', and then flow channel 611-2' further divides into reverse-flow channels 611-2' and 611-3'. Although merge/division ratios of 1:3 are shown in FIG. 6B for both forward and reverse flow channels, other ratios are equally envisaged, and the ratios need not be equal for the forward and reverse flow channels.

FIGS. 7A, 7B, and 7C show aspects of an example windward envelope portion 706 of another airborne craft. The windward envelope portion of FIG. 7 is similar to that of FIG. 6, except that metallic outer wall 707 includes a plurality of thru-holes 718 extending through the outer wall and into the inter-wall volume 709. The thru-holes are configured to release at least a portion of the coolant from the inter-wall volume onto the exterior surface 719 of the outer wall, thereby forming a barrier film 720 on the exterior surface. Shown as a curved vertical surface in FIG. 7C, the barrier film is a thin film of coolant that adheres to and flows over the exterior surface. The barrier film provides enhanced cooling, such as via extended stagnation heat-flux capacity. The thru-holes are provided primarily near the nose, where peak heating occurs. In the illustrated example, coolant-flow partitions 710 are arranged in the inter-wall volume and join outer wall 707 to inner wall 708, thereby delimiting a plurality of channels 711/711'. In such examples, the plurality of through holes 718 may extend into the channels. In the illustrated example, each of the plurality of thru-holes is oblique to the exterior surface of the outer wall to reduce back pressure. Thru-holes may be about 60 degrees to the normal of the outer surface, for instance, and the outer wall may be about 0.050 inch. Other bore angles and outer-wall thicknesses are equally envisaged. The plurality of thru-holes may be arranged in any pattern configured to produce a desirable flow field—e.g., a diamond pattern. In some examples, each of the plurality of thru-holes may be between 0.005 and 0.04 inch in diameter, or between 0.02 and 0.04 inch in diameter. More generally, the shapes and sizes of the thru-holes may be selected as necessary to provide effective film cooling. Such shapes include cylindrical, conical, rectangular, and fan-shape, for instance. In some examples, the laterally averaged film cooling effectiveness, $\bar{\eta}$ may be about 0.30, providing a 1.1× factor on heat transfer coefficient due to increased turbulence.

FIGS. 7C, 8, and 9 show expanded views of the outer walls and inter-wall volumes of the illustrated windward envelope portions. In envelope portion 706, an optional thermal barrier coating 721 is arranged on outer wall 707. The thermal barrier coating may comprise one or more of a superalloy, a refractory metal, a ceramic, and graphite. In FIG. 7, the inter-wall volume is vacant, providing substantially laminar flow through channels 711/711'. In FIGS. 8 and 9, by contrast, structures of extended surface area are arranged between opposing coolant-flow partitions 710. These structures accelerate heat transfer by increasing the interfacial surface area in contact with the coolant and also by encouraging turbulent flow (which reduces the dead-layer thickness in the channels). In FIG. 8 the structure in channel 811 includes fins 822 (e.g., fins 822-1, 822-2), which may be formed by additive manufacture (AM), for example. Various other regular and irregular structures, including micro-truss structures, may be used. In FIG. 9 the structure in channel 911 includes a porous metal 923. In some examples a porous metal may include a sintered metal particulate, such as a metal powder or grain. Particulate of suitable grain size may be selectively deposited in the channels and then subject to sintering temperatures to form this structure.

Figure 10:
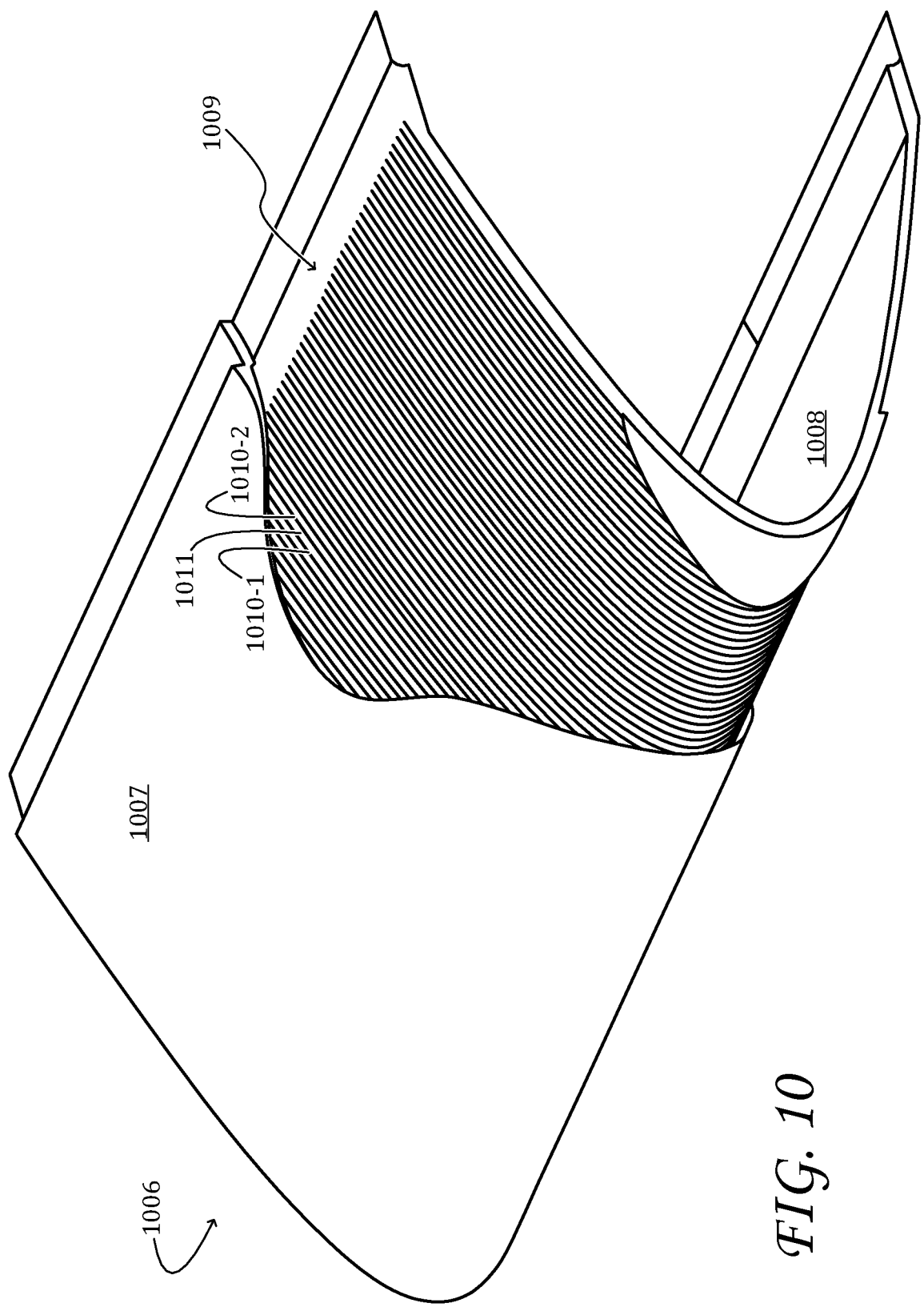
FIG. 10 shows aspects of another example envelope portion of an airborne craft.

FIG. 10 provides a cut-away drawing of a windward envelope portion 1006 that takes the form of a leading edge of a wing, swept wing, or other part of an airborne craft. The windward envelope portion includes metallic outer wall 1007, metallic inner wall 1008, and inter-wall volume 1009, where opposing coolant-flow partitions 1010 (e.g., 1010-1, 1010-2, etc.) define plural channels 1011. In windward envelope portion 1006, the coolant-flow partitions extend around the leading edge, substantially in parallel.

Figure 11:
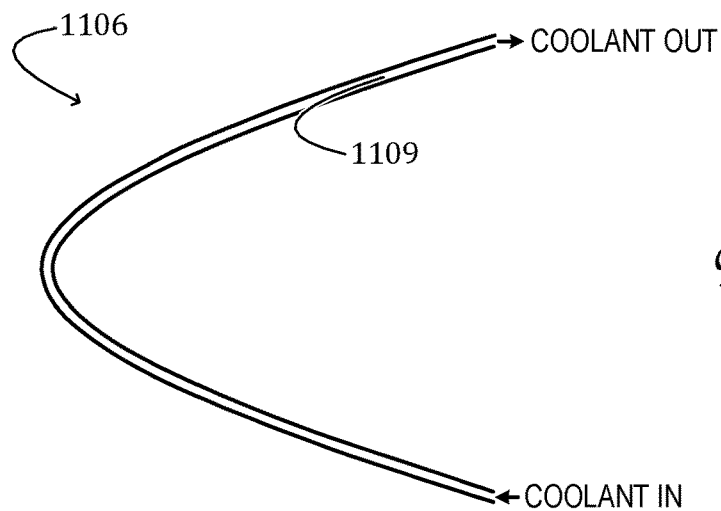
FIGS. 11, 12, and 13 show example variants of the envelope portion of FIG. 10.
Figure 12:
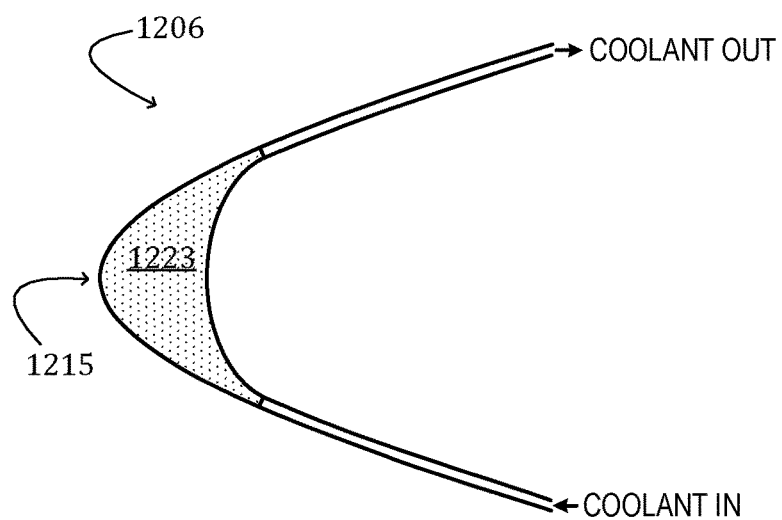
Figure 13:
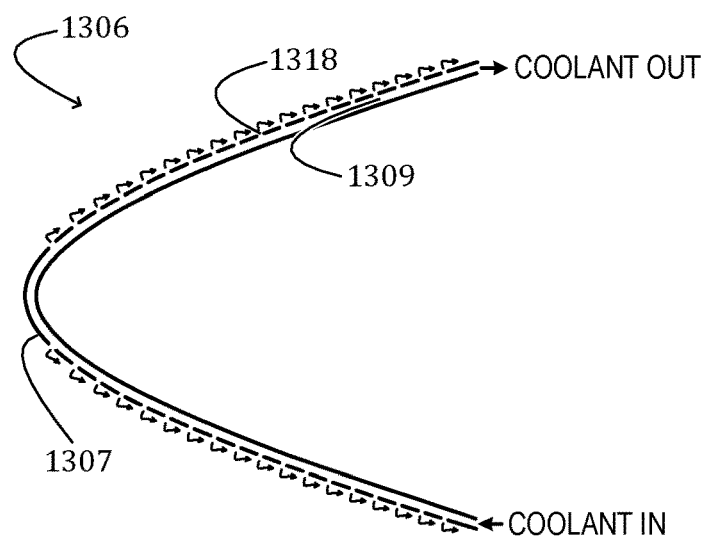

FIGS. 11 through 13 show aspects of three different variants of the windward envelope portion as shown in FIG. 10. In windward envelope portion 1106 of FIG. 11, unheated coolant admitted to inter-wall volume 1109 on one side of the leading edge is conducted directly around leading edge 1115 to the opposite side of the leading edge. In some examples, a coolant reservoir may be coupled fluidically to the inter-wall volume via manifolds that run along the leading edge (e.g., across the wing span or any portion thereof). In windward envelope 1206 of FIG. 12, the coolant flows through a structure 1223 of an extended surface area structure (e.g., a sintered-metal particulate or porous metal heat exchanger as described in connection to FIG. 9, or fins as described in connection to FIG. 8). The structure of extended surface area may be arranged to fill a portion of the volume behind outer wall 1207 proximate to leading edge 1215. In windward envelope portion 1306 of FIG. 13, the leading edge includes a plurality of thru-holes 1318 extending through outer wall 1307 and into the inter-wall volume 1309 to release at least a portion of the coolant onto the exterior surface of the leading edge, thereby forming a barrier film on the edge exterior surface. Here, as in other examples, a thermal-barrier coating may be applied over the exterior surface of the exterior wall in order to reduce the outer-wall structure temperature during hypersonic flight.

In some examples, any envelope portion hereinabove may be formed as a monolith. In other words, the outer walls, inner walls, and coolant-flow partitions may be formed together, seamlessly, rather than being formed separately and then joined at the seams. In more particular examples, an envelope portion including an outer wall, inner wall, and plural coolant flow partitions may comprise a monolith of a fused metal grain. More particularly still, any of the envelope portions disclosed herein may be formed by AM using any suitable metal grain as a feedstock. One non-limiting example of a suitable metal grain feedstock is C-103 niobium alloy.

Figure 14:
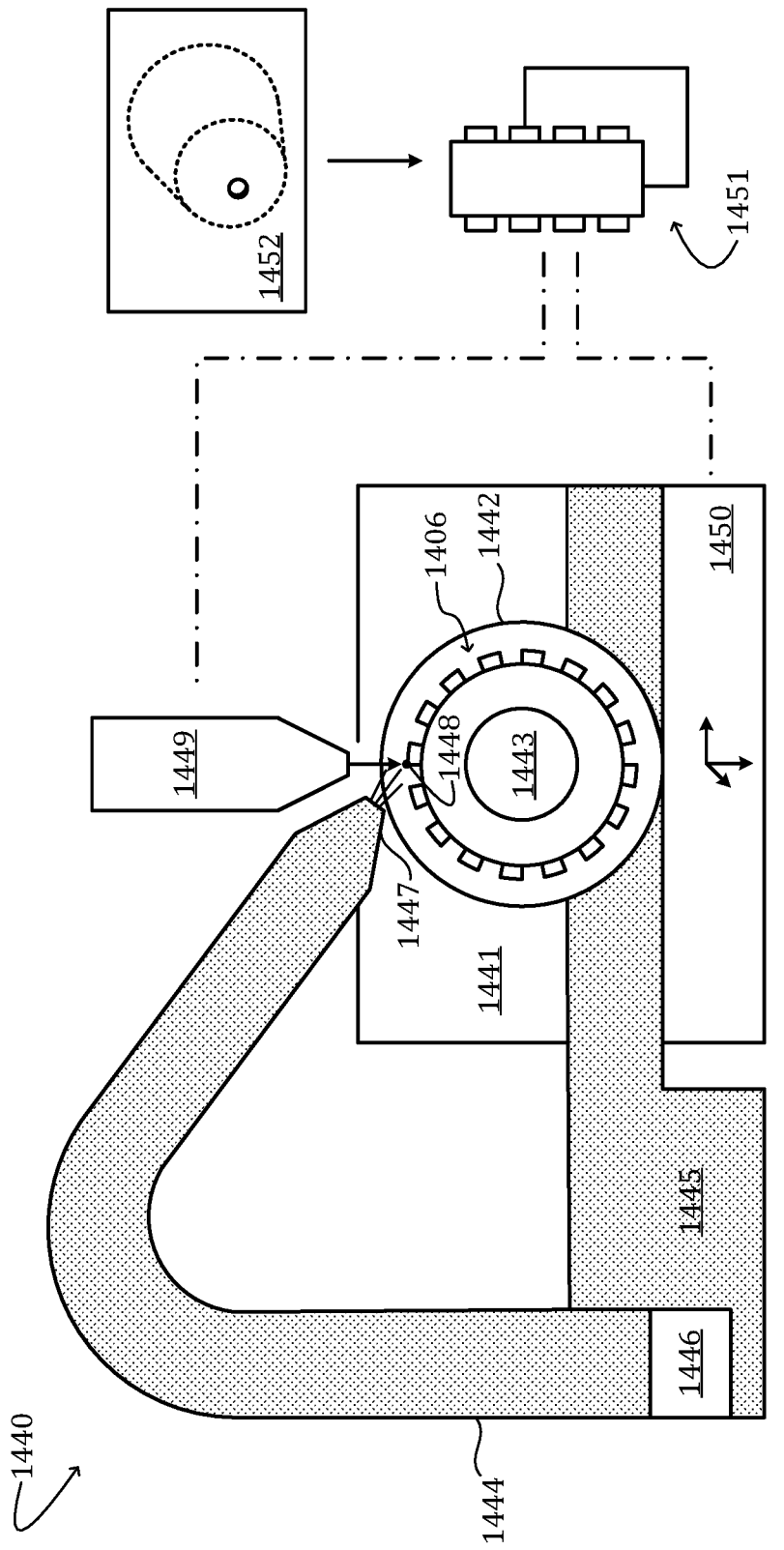
FIGS. 14 and 15 show aspects of example apparatuses for additive manufacture (AM) of metal envelope portions of airborne craft.

FIG. 14 shows aspects of an example apparatus 1440 configured for additive manufacture of envelope portion 1406. Apparatus 1440 includes a chamber 1441 that encloses envelope portion 1406 during the additive-manufacture process. For manufacture of rotationally symmetric envelope portions, the chamber may include a rotating chuck 1442 to which the envelope portion is secured via a sacrificial post 1443. In apparatus 1440, envelope portion 1406 is formed in layers by spatially selective addition of metal to the underlying layer of the envelope portion, starting with sacrificial post 1443. In other examples, the envelope portion or sacrificial post or plate may be secured via a vice, clamp, or anvil.

Apparatus 1440 includes a metal-particulate reservoir 1444 configured to store a metal particulate 1445. The metal particulate may comprise a metal grain or powder. Apparatus 1440 includes a metal particulate pump 1446 configured to pump metal particulate 1445 from metal-particulate reservoir 1444 and to deliver the metal particulate to nozzle 1447. The nozzle, in the illustrated example, is arranged over locus 1448 where fused metal particulate is to be added to envelope portion 1406. Other configurations may include a plurality of nozzles that disperse a thin layer of the metal particulate over the entire surface of the envelope portion to be formed. In either case, chamber 1441 may be configured such that unfused metal particulate is returned to metal-particulate reservoir 1444 for reuse.

Apparatus 1440 includes an energy-beam source 1449 configured to deliver an energy beam to locus 1448, in order to fuse the metal particulate at the locus and thereby add the fused metal particulate to envelope portion 1406. In some implementations, the energy-beam source may include a laser, such as a pulse-modulated, high-power infrared laser. In other implementations, an electron-beam source, plasma-arc, gas-metal arc source, or virtually any energy source of suitable power and focal area may be used in lieu of the laser.

Apparatus 1440 is configured to maintain a non-reactive environment in chamber 1441, at least during fusion of the metal particulate. The non-reactive environment may include an environment depleted of oxygen and, in some examples, of nitrogen. In some examples, the non-reactive environment may include vacuum. In some examples, the non-reactive environment may include an atmosphere of an inert gas such as argon or helium. In some examples, inert gas may flow through chamber 1441 to provide a continuous purge. In other examples, the atmosphere may be nominally static, to avoid excessive cooling of the fused metal particulate.

Apparatus 1440 includes a translational stage 1450 mechanically coupled to rotating chuck 1442. As envelope portions are formed layer-by-layer in apparatus 1440, the translational stage may be configured to gradually lower the height of the rotating chuck as successive layers of the envelope portion are built up. The translational stage may also be configured to move the rotating chuck laterally to controllably vary the relative position of locus 1448 relative to the frame of reference of the rotating chuck, and accordingly, of envelope portion 1406. The translational stage may include two or more component translational stages (e.g., linear actuators) configured to move the chuck in two or more corresponding directions, which may include Cartesian X, Y, and Z axes, for instance. In some examples, one or more component rotational stages may be used in lieu of, or in addition to the one or more component translational stages. Generally speaking, an AM apparatus offering concurrent tilt and rotation of the article to be formed is beneficial for conical nose portions, as it allows closer approach of locus 1448 to the nose. In other examples equally consonant with this disclosure, a translational or rotational stage may be coupled mechanically to energy-beam source 1449 and or nozzle 1447, and rotating chuck 1442 may be stationary. In still other examples, the rotating chuck as well as the energy-beam source and/or nozzle may be movable. When applied to an energy-beam source in the form of a laser, a rotational stage may include a mirror having a controlled deflection and thereby configured to reflect the focused beam to any desired locus.

Apparatus 1440 includes a computer 1451. Computer 1451 is operatively coupled to translational stage 1450 and configured to control in real time the relative position of locus 1448 relative to the frame of reference of rotating chuck 1442 via a series of actuator-control signals. In addition, the computer is operatively coupled to energy-beam source 1449 and configured to control in real time, via one or more energy-beam control signals, the power delivered to the locus. Computer 1451 is further configured to receive a digital model 1452 that represents the topology of the envelope portion to be formed. The nature and/or digital data structure of the digital model is not particularly limited. The digital model may include a CAD file in some examples. The computer is configured to vary the actuator- and energy-beam control-signal outputs based on the digital model, so as to achieve additive manufacture of the envelope portion as defined by the digital model.

Figure 15:
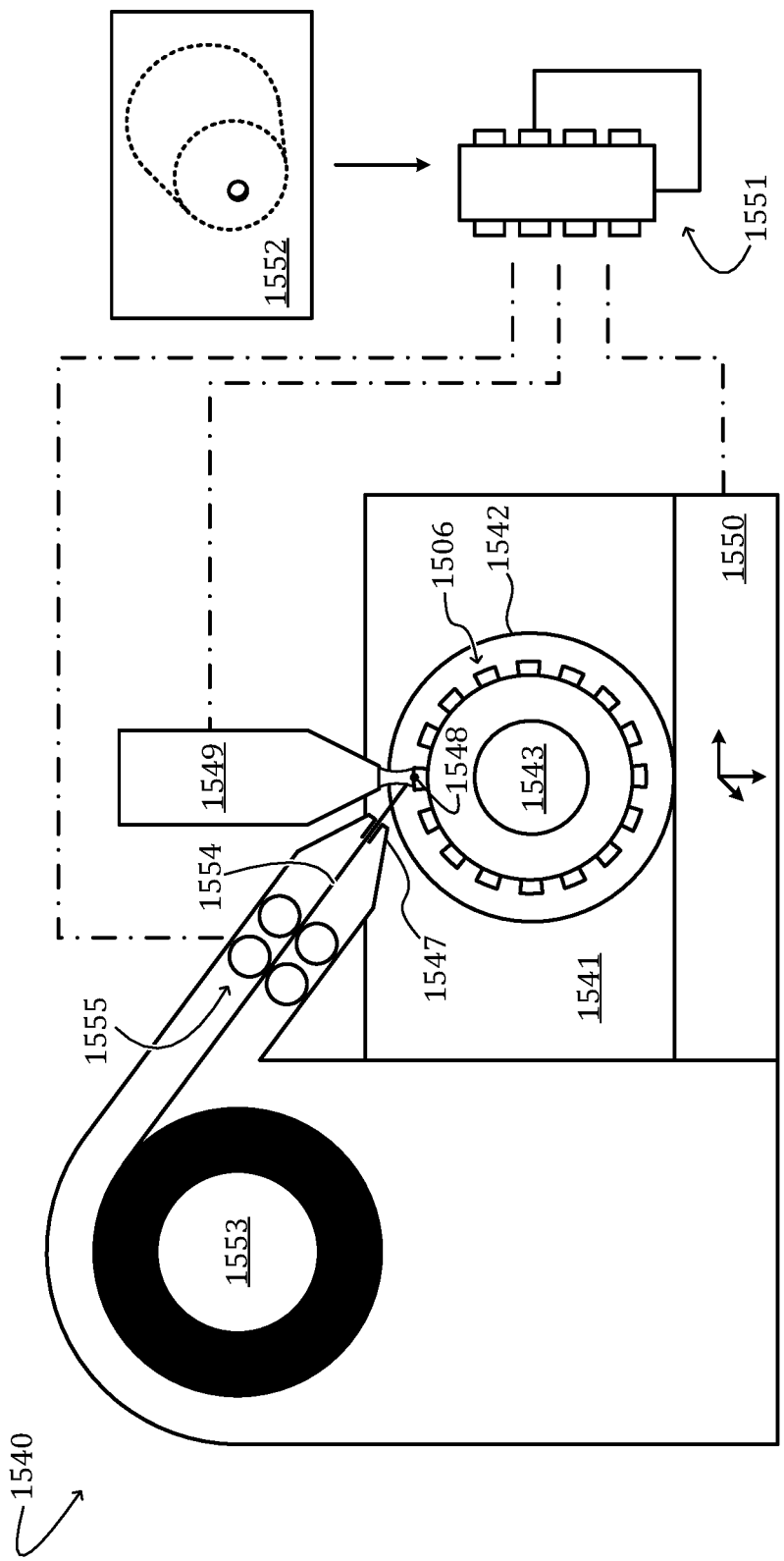

FIG. 15 shows another apparatus 1540 configured for additive manufacture of an envelope portion 1506. In apparatus 1540, chamber 1541 encloses the envelope portion, which is secured to rotating chuck 1542.

Apparatus 1540 includes a metal-wire spool 1553 configured to store a supply of metal embodied as metal wire 1554. The metal wire may comprise wire of any shape, dimension, and/or gauge—e.g., 14, 16, 18, or 20 gauge, for example. Apparatus 1540 includes a wire feeder 1555 configured to conduct metal wire 1554 from metal-wire spool 1553 and to deliver the metal wire to nozzle 1547. The nozzle, in the illustrated example, is arranged adjacent to locus 1548, where the fused form of the metal wire is to be added to envelope portion 1506. In apparatus 1540, energy-beam source 1549 takes the form of an electron-beam emitter, which emits an electron beam. In other implementations, a laser, plasma-arc, gas-metal arc source, or virtually any energy source may be used in lieu of the electron-beam emitter.

As in the previous configuration, apparatus 1540 is configured to maintain a non-reactive environment in chamber 1541, at least during fusion of metal wire 1554. The non-reactive environment may include vacuum, or, in some examples, an atmosphere of an inert gas such as argon or helium. In implementations in which the non-reactive environment is an evacuated environment, energy-beam source 1549 may include an electrically heated filament configured to promote thermionic emission of electrons. In implementations in which the non-reactive environment comprises an inert gas, electron emission may be facilitated by ionization of the inert gas. In these and other implementations, energy-beam source 1549 may be biased at a negative voltage while rotating chuck 1542 and envelope portion 1506 are maintained at ground potential. In this manner, electrons from the energy-beam source are accelerated toward locus 1548 of the envelope portion, where material deposition is desired.

In apparatus 1540, metal-wire feeder 1555 feeds metal wire 1554 directly into the electron beam or into locus 1548, which is heated by the electron beam. In this example, energy-beam source 1549 comprises a refractory metal, such as tungsten, which is not intended to be consumed in the additive-manufacture process. In other examples, the energy-beam source may take the form of a plasma arc or gas-metal arc. In some variants, the consumable metal wire itself may be part of the heating circuit, may carry an electric current, and may be biased at a different voltage than envelope portion 1506.

As in the previous configuration, apparatus 1540 includes a translational stage 1550 mechanically coupled to rotating chuck 1542. In other examples equally consonant with this disclosure, a translational or rotational stage may be coupled mechanically to energy-beam source 1549 and or nozzle 1547, and rotating chuck 1542 may be stationary. In still other examples, the rotating chuck as well as the energy-beam source and/or nozzle may be movable.

In apparatus 1540, computer 1551 is operatively coupled to translational stage 1550, energy-beam source 1549, and metal-wire feeder 1555. The computer is configured to receive a digital model 1552 of the envelope portion to be formed, as described above.

No aspect of the drawings or description herein should be understood in a limiting sense, as numerous variations, extensions, and omissions are also envisaged. Although powder-feed and wire-feed AM variants are described above, neither of those variants are particularly required, as powder-bed and other AM technologies may be used instead.

It will be understood that the configurations and/or approaches described herein are exemplary in nature, and that these specific embodiments or examples are not to be considered in a limiting sense, because numerous variations are possible. The specific routines or processes described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An envelope portion of an airborne craft, the envelope portion comprising:
   a nose;
   a metallic outer wall;
   a metallic inner wall arranged interior to the outer wall, the outer and inner walls delimiting an inter-wall volume configured to support a flow of coolant to cool the outer wall during atmospheric heating of the outer wall; and
   a plurality of coolant-flow partitions arranged in the inter-wall volume, joining the outer and inner walls, and extending radially and helically about an axis constructed through the nose and aligned to a trajectory of the airborne craft, the plurality of coolant-flow partitions delimiting:
   a plurality of forward-flow channels configured to receive coolant from a coolant reservoir and to conduct the coolant through the inter-wall volume; and
   a plurality of reverse-flow channels configured to receive and conduct the coolant through the inter-wall volume,
   wherein the plurality of reverse-flow channels are arranged fluidically downstream of the plurality of forward-flow channels.

2. The envelope portion of claim 1 wherein the plurality of coolant-flow partitions include opposing coolant-flow partitions, and wherein a plurality of fins are arranged between the opposing coolant-flow partitions, presenting a structure of extended interfacial surface area in contact with the coolant and encouraging turbulent coolant flow.

3. The envelope portion of claim 1 wherein the plurality of coolant-flow partitions include opposing coolant-flow partitions, and a metal grain selectively deposited between the opposing coolant-flow partitions and subjected to sintering temperatures, to form a structure that reduces a dead-layer thickness in the flow of the coolant and encourages turbulent coolant flow.

4. The envelope portion of claim 1 further comprising the coolant reservoir coupled fluidically to the inter-wall volume.

5. The envelope portion of claim 1 wherein the outer wall includes a plurality of thru-holes extending through the outer wall and into the inter-wall volume to release at least a portion of the coolant onto an exterior surface of the outer wall, thereby forming a barrier film on the exterior surface.

6. The envelope portion of claim 1 further comprising a thermal-barrier coating arranged on an exterior surface of the outer wall.

7. The envelope portion of claim 1 wherein the airborne craft is a hypersonic missile, spacecraft, re-entry vehicle, or aircraft.

8. The envelope portion of claim 1 wherein the plurality of coolant-flow partitions include opposing coolant-flow partitions that define a continuously curved and elongate coolant-flow path.

9. The envelope portion of claim 1 wherein the plurality of coolant-flow partitions are configured to increasingly merge the plurality of forward-flow channels with increasing proximity to the nose.

10. The envelope portion of claim 1 wherein the plurality of coolant-flow partitions are configured to increasingly divide the plurality of reverse-flow channels with increasing distance from the nose.

11. The envelope portion of claim 1,
   wherein the plurality of coolant-flow partitions are configured to increasingly merge the plurality of forward-flow channels with increasing proximity to the nose, and
   wherein the plurality of coolant-flow partitions are configured to increasingly divide the plurality of reverse-flow channels with increasing distance from the nose.

12. An envelope portion of an airborne craft, the envelope portion comprising:
   a nose;
   a metallic outer wall including a plurality of thru-holes;
   a metallic inner wall arranged interior to the outer wall, the outer and inner walls delimiting an inter-wall volume configured to support a flow of coolant to cool the outer wall during atmospheric heating of the outer wall; and a plurality of coolant-flow partitions arranged in the inter-wall volume, joining the outer and inner walls, and extending radially and helically about an axis constructed through the nose and aligned to a trajectory of the airborne craft, the plurality of coolant-flow partitions delimiting:
- a plurality of forward-flow channels configured to receive coolant from a coolant reservoir and to conduct the coolant through the inter-wall volume; and
- a plurality of reverse-flow channels configured to receive and conduct at last a portion of the coolant through the inter-wall volume, wherein the plurality of reverse-flow channels are arranged fluidically downstream of the plurality of forward-flow channels, and wherein the plurality of thru-holes of the outer wall extend into the inter-wall volume to release at least a portion of the coolant onto an exterior surface of the outer wall, thereby forming a barrier film on the exterior surface.

13. The envelope portion of claim 12 wherein each of the plurality of thru-holes is oblique to the exterior surface of the outer wall.

14. The envelope portion of claim 12 wherein the plurality of thru-holes are arranged in a diamond pattern, and wherein each of the plurality of thru-holes is between 0.005 and 0.04 inch in diameter.

15. The envelope portion of claim 12 wherein the plurality of coolant-flow partitions include opposing coolant-flow partitions that define a continuously curved and elongate coolant-flow path.

16. The envelope portion of claim 12 wherein the plurality of forward-flow channels extend to a manifold configured to receive the coolant from the coolant reservoir.

17. The envelope portion of claim 12 wherein the outer wall, the inner wall, and the one or more coolant-flow partitions comprise a metal grain selectively deposited between the opposing coolant-flow partitions and subjected to sintering temperatures.

18. The envelope portion of claim 12 wherein the plurality of coolant-flow partitions straighten with increasing distance from the nose.

19. The envelope portion of claim 12 wherein a plurality of fins are arranged between the opposing coolant-flow partitions.

20. The envelope portion of claim 12 further comprising the coolant reservoir.

* * * * *